(12) United States Patent
Xu et al.

(10) Patent No.: US 10,333,158 B2
(45) Date of Patent: Jun. 25, 2019

(54) PLATE ASSEMBLY HAVING SEALING MEMBERS IN AN OFFSET ALIGNMENT

(71) Applicant: GM GLOBAL TECHNOLOGY OPERATIONS LLC, Detroit, MI (US)

(72) Inventors: Siguang Xu, Rochester Hills, MI (US); Xi Yang, Bloomfield Hills, MI (US); Liang Xi, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 339 days.

(21) Appl. No.: 15/334,336

(22) Filed: Oct. 26, 2016

(65) Prior Publication Data

US 2018/0114992 A1 Apr. 26, 2018

(51) Int. Cl.
*H01M 8/0273* (2016.01)
*H01M 8/0247* (2016.01)
*H01M 8/2432* (2016.01)

(52) U.S. Cl.
CPC ....... *H01M 8/0273* (2013.01); *H01M 8/0247* (2013.01); *H01M 8/2432* (2016.02); *H01M 2250/20* (2013.01); *Y02T 90/32* (2013.01)

(58) Field of Classification Search
CPC ............. H01M 8/0273; H01M 8/2432; H01M 8/0247; H01M 2250/20
See application file for complete search history.

(56) References Cited

U.S. PATENT DOCUMENTS

| | | | |
|---|---|---|---|
| 7,718,293 B2 | 5/2010 | Strobel et al. | |
| 8,371,587 B2 | 2/2013 | Fly et al. | |
| 2005/0238942 A1* | 10/2005 | Kikuchi | H01M 8/0258 429/457 |
| 2012/0107713 A1 | 5/2012 | Miller et al. | |
| 2015/0372321 A1* | 12/2015 | Araki | H01M 8/1004 429/483 |

* cited by examiner

*Primary Examiner* — Lisa S Park
(74) *Attorney, Agent, or Firm* — Quinn IP Law

(57) ABSTRACT

A plate assembly includes a first plate and a second plate positioned adjacent to one another. The first plate includes a first sealing member formed thereon. The second plate includes a second sealing member formed thereon. The first sealing member includes a first end surface and first opposing sides extending from the first end surface. The second sealing member includes a second end surface and second opposing sides extending from the second end surface. The first and second sealing members are offset relative to one another by a first offset distance ($D_1$) in a first longitudinal direction. By varying the sealing member's base width periodically, a greater sealing force is achieved. By offsetting alignment of pairs of sealing members along the seal path, uniform pressure along the seal path is achieved.

14 Claims, 4 Drawing Sheets

PLATE ASSEMBLY HAVING SEALING MEMBERS IN AN OFFSET ALIGNMENT

INTRODUCTION

The present disclosure relates to a plate assembly having sealing members with an offset alignment. Plate assemblies, such as fuel cells for example, employ a stack of plates that are held together and compressed. Sealing members may be employed between various plates to prevent fluid leakage.

SUMMARY

A plate assembly includes a first plate and a second plate positioned adjacent to one another. The first plate includes a first sealing member formed thereon. The second plate includes a second sealing member formed thereon. The first sealing member includes a first end surface and first opposing sides extending from the first end surface. The first opposing sides are contiguous with the first plate at respective first bases. The second sealing member includes a second end surface and second opposing sides extending from the second end surface. The second opposing sides are contiguous with the second plate at respective second bases. The first and second sealing members are offset relative to one another by a first offset distance ($D_1$) in a first longitudinal direction.

The first and second end surfaces may each be substantially planar. The first sealing member defines a first width between the first opposing sides at the first base, the first width varying continuously between a maximum first width and a minimum first width in a lateral direction. The second sealing member defines a second width between the second opposing sides at the second base, the second width varying continuously between a second maximum width and a second minimum width in the lateral direction.

By varying the sealing member's base width periodically, a greater sealing force is achieved. By offsetting alignment of pairs of sealing members along the seal path, uniform pressure along the seal path is achieved. The first and second sealing members may be positioned such that the first maximum width may be aligned longitudinally with the second minimum width and the first minimum width may be aligned longitudinally with the second maximum width.

A plate assembly includes a plurality of bipolar plates, such as an upper bipolar plate and a lower bipolar plate, positioned in a stack. The upper bipolar plate includes a first plate having a first sealing member formed thereon, and a second plate having a second sealing member formed thereon. The lower bipolar plate includes a third plate having a third sealing member formed thereon and a fourth plate having a fourth sealing member formed thereon. The first and second sealing members are offset relative to one another by a first offset distance ($D_1$) in a first longitudinal direction. The third and the fourth sealing members are offset relative to one another by a second offset distance ($D_2$) in a second longitudinal direction.

The first offset distance ($D_1$) may be different from the second offset distance ($D_2$). The first longitudinal direction may be opposite to the second longitudinal direction. The first, second, third and fourth sealing members define respective first, second, third and fourth widths varying continuously between respective maximum first, second, third and fourth widths and respective minimum first, second, third and fourth widths in a lateral direction.

The first and second sealing members may be positioned such that the first maximum width is aligned longitudinally with the second minimum width and the first minimum width is aligned longitudinally with the second maximum width. The third and fourth sealing members may be positioned such that the third maximum width is aligned longitudinally with the fourth minimum width and the third minimum width is aligned longitudinally with the fourth maximum width.

The first and second sealing members are characterized by respective cyclical patterns repeating at a first predefined period. The first offset distance ($D_1$) may be one-quarter of the first predefined period. The third and fourth sealing members are characterized by respective cyclical patterns repeating at a second predefined period. The second offset distance ($D_2$) may be one-quarter of the second predefined period. The first predefined period may be different from the second predefined period.

The above features and advantages and other features and advantages of the present disclosure are readily apparent from the following detailed description of the best modes for carrying out the disclosure when taken in connection with the accompanying drawings.

DETAILED DESCRIPTION

Figure 1:
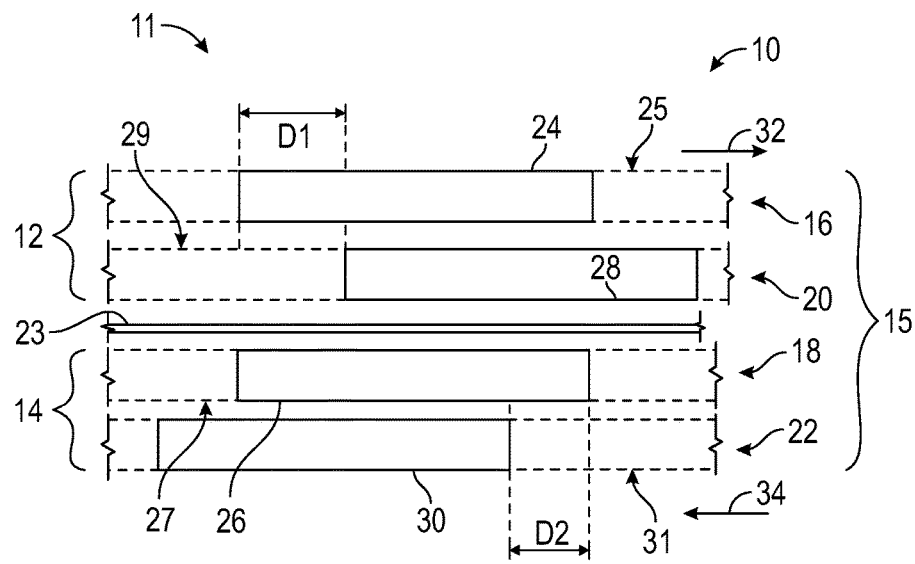
FIG. 1 is a schematic exploded fragmentary view of a plate assembly having an upper bipolar plate with first and second plates, and a lower bipolar plate with third and fourth plates, in accordance with a first embodiment of the disclosure.

Referring to the drawings, wherein like reference numbers refer to like components, FIG. 1 schematically illustrates an exploded view of a plate assembly 10. The plate assembly 10 may be part of a device 11. The device 11 may be a fuel cell, which combines a fuel such as hydrogen and an oxidant such as oxygen to generate electricity for powering various devices, including vehicles. The device 11 may take many different forms and include multiple and/or alternate components and facilities.

Referring to FIG. 1, the assembly 10 includes one or more bipolar plates, such as an upper bipolar plate 12 and a lower bipolar plate 14, positioned in a stack 15. While two plates are depicted in FIG. 1, it is understood that the number of bipolar plates in the assembly 10 may vary. Each of the upper and lower bipolar plates 12, 14 include two relatively thin, facing unipolar plates or plates. Referring to FIG. 1, the upper bipolar plate 12 includes a first plate 16 and a second plate 20. The lower bipolar plate 14 includes a third plate 18 and a fourth plate 22. The outer surfaces of the first and third plates 16, 18 may define flow paths for delivery of an oxidant reactant, while the outer surfaces of the third and fourth plates 20, 22 may define flow paths for delivery of a hydrogen reactant (or vice-versa), for generation of electric power. The stack 15 may include over a hundred plates that are compressed and held together by fasteners (not shown) at the edges of the stack 15. The upper and lower bipolar plates 12, 14 may be separated by a membrane 23. The assembly 10 may include other members not shown, such as diffusion media and micro-seals.

Referring to FIG. 1, the upper bipolar plate 12 includes respective elongated protuberances, referred to herein as first and second sealing members 24, 28, formed on the first and second plates 16, 20, respectively. The first and second sealing members 24, 28 may be formed via a stamping operation and prevent the leakage of fluids between the first and second plates 16, 20. The first and second plates 16, 20 define respective planar portions 25, 29. The first and second sealing members 24, 28 are raised relative to the respective planar portions 25, 29.

Similarly, referring to FIG. 1, the lower bipolar plate 14 includes respective elongated protuberances, referred to herein as third and fourth sealing members 26, 30, formed on the third and fourth plates 18, 22, respectively. The third and fourth sealing members 26, 30 may be formed via a stamping operation and prevent the leakage of fluids between the third and fourth plates 18, 22. The third and fourth plates 18, 22 define respective planar portions 27, 31. The third and fourth sealing members 26, 30 are raised relative to the respective planar portions 27, 31.

Figure 2:
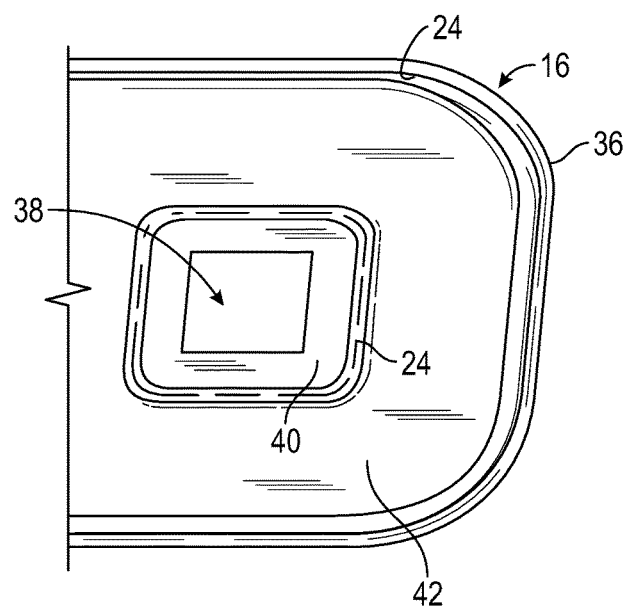
FIG. 2 is a perspective fragmentary view of the first plate of FIG. 1.

FIG. 2 is a perspective fragmentary view of the first plate 16 of the upper bipolar plate 12 of FIG. 1. The first sealing member 24 may be positioned adjacent to an outer edge 36 of the first plate. The first sealing member 24 may be positioned between an edge portion 40, surrounding an aperture 38 formed in the first plate 16, and a central portion 42.

Referring to FIG. 1, the first sealing member 24 and the second sealing member 28 of the upper bipolar plate 12 are offset relative to one another by a first offset distance ($D_1$) in a first longitudinal direction 32. Referring to FIG. 1, the third and fourth sealing members 26, 30 of the lower bipolar plate 14 are offset relative to one another by a second offset distance ($D_2$) in a second longitudinal direction 34. In one example, the first longitudinal direction 32 is opposite to the second longitudinal direction 34. The first offset distance ($D_1$) may be different from the second offset distance ($D_2$).

Figure 3:
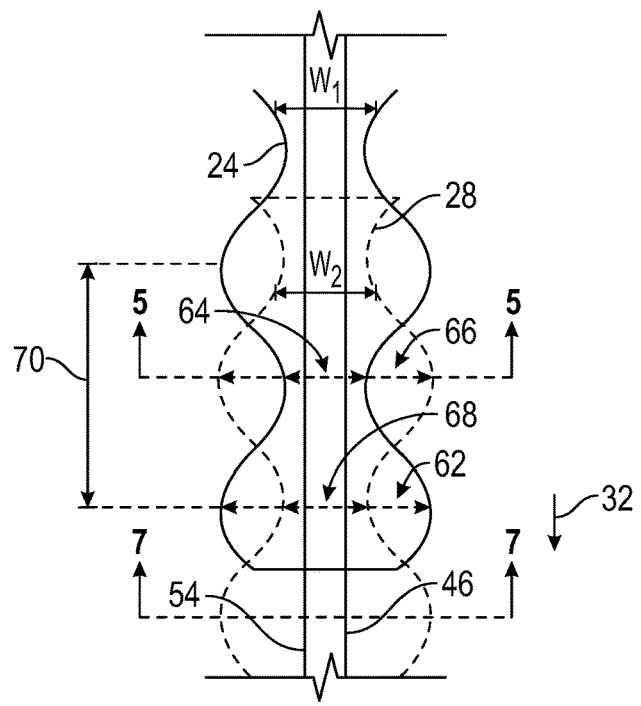
FIG. 3 is a schematic fragmentary top view of the upper bipolar plate of FIG. 1.
Figure 5:
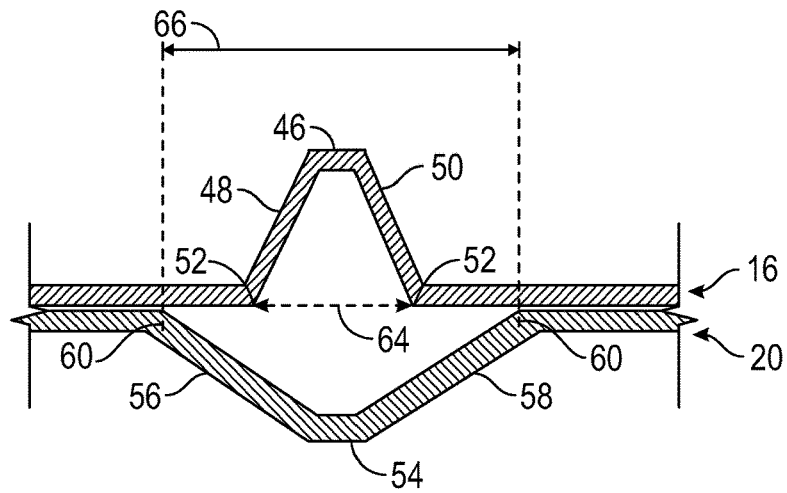
FIG. 5 is a schematic sectional view through axis 5-5 of FIG. 3.
Figure 7:
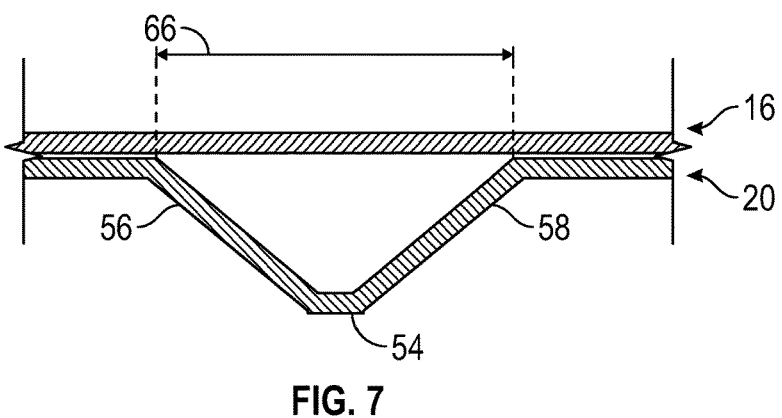
FIG. 7 is a schematic sectional view through axis 7-7 of FIG. 3.

FIG. 3 is a schematic fragmentary top view of the upper bipolar plate 12, showing the first sealing member 24 in a solid line and the second sealing member 28 in dashed lines. FIG. 5 is a schematic sectional view through axes 5-5 of FIG. 3. FIG. 7 is a schematic sectional view through axis 7-7 of FIG. 3.

Figure 4:
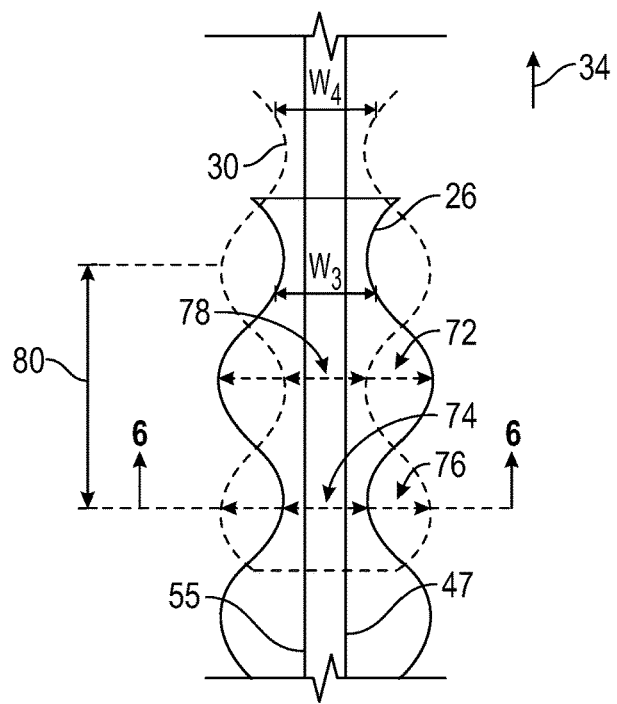
FIG. 4 is a schematic fragmentary top view of the lower bipolar plate of FIG. 1.
Figure 6:
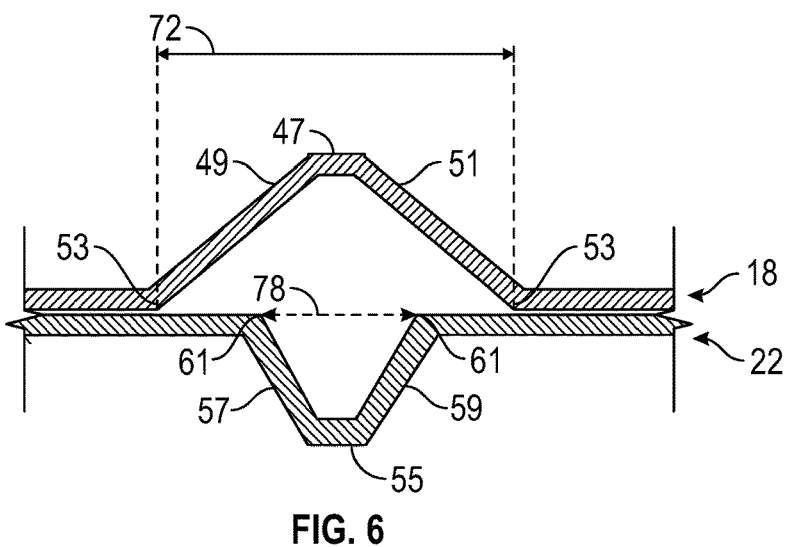
FIG. 6 is a schematic sectional view through axis 6-6 of FIG. 4.

FIG. 4 is a schematic fragmentary top view of the lower bipolar plate 14, showing the third sealing member 26 in a solid line and the fourth sealing member 30 in dashed lines. FIG. 6 is schematic sectional view through axis 6-6 of FIG. 4.

Referring to FIGS. 3 and 5, the first sealing member 24 includes a first end surface 46 and first opposing sides 48, 50 extending from the first end surface 46. The first opposing sides 48, 50 are each contiguous with the first plate 16, at respective first bases 52. Referring to FIG. 3, the first sealing member 24 defines a first width $W_1$ between the first opposing sides 48, 50 (at the first base 52) in a lateral direction.

Referring to FIGS. 3 and 5, the second sealing member 28 includes a second end surface 54 and second opposing sides 56, 58 extending from the second end surface 54. The second opposing sides 56, 58 are each contiguous with the second plate 20 at respective second bases 60. The first and second end surfaces 46, 54 (see FIGS. 3 and 5) may each be substantially planar and have a common, constant width. Referring to FIG. 3, the second sealing member 28 defines a second width $W_2$ between the second opposing sides 56, 58 (at the second base 60).

By periodically varying the base width of the first, second, third and fourth sealing members 24, 28, 26, 30, a greater sealing force is achieved. However, the variable base width may introduce pressure variations along the seal path. By offsetting alignment of pairs of sealing members along the seal path, uniform pressure along the seal path is achieved. Referring to FIG. 3, the first width $W_1$ varies continuously between a first maximum width 62 and a first minimum width 64 (shown in FIG. 5). Referring to FIG. 3, the second width $W_2$ varies continuously between a second maximum width 66 (shown in FIG. 5) and a second minimum width 68.

Similarly, referring to FIGS. 4 and 6, the third sealing member 26 includes a third end surface 47 and third opposing sides 49, 51 extending from the third end surface 47. The third opposing sides 49, 51 are each contiguous with the third plate 18 at respective third bases 53. Referring to FIG. 4, the third sealing member 26 defines a third width $W_3$, between the third opposing sides 49, 51 (at the third base 53) in the lateral direction.

Referring to FIGS. 4 and 6, the fourth sealing member 30 includes a fourth end surface 55 and fourth opposing sides 57, 59 extending from the fourth end surface 55. The fourth opposing sides 57, 59 are each contiguous with the fourth plate 30 at respective fourth bases 61. The third and fourth end surfaces 47, 55 (see FIGS. 4 and 6) may each be substantially planar and have a common, constant width. Referring to FIG. 4, the fourth sealing member 30 defines a fourth width $W_4$, between the fourth opposing sides 57, 59 (at the fourth base 61) in the lateral direction.

Referring to FIG. 3, the first and second sealing members 24, 28 are characterized by respective cyclical patterns repeating at a first predefined period 70. The first offset distance ($D_1$) may be one-quarter of the first predefined period 70. Referring to FIG. 4, the third and fourth sealing members 26, 30 are characterized by respective cyclical patterns repeating at a second predefined period 80. The second offset distance ($D_2$) may be one-quarter of the second predefined period 80.

Referring to FIG. 4, the third width $W_3$ varies continuously between a third maximum width 72 and a third minimum width 74. Referring to FIG. 4, the fourth width $W_4$ varies continuously between a fourth maximum width 76 and a fourth minimum width 78 (see FIG. 6).

Referring to FIGS. 3 and 5, the first and second sealing members 24, 28 may be positioned such that the first minimum width 64 is aligned longitudinally with the second maximum width 66. Referring to FIG. 3, the first and second sealing members 24, 28 may be positioned such that the first maximum width 62 is aligned longitudinally with the second minimum width 68. By offsetting alignment in this manner, uniform pressure distribution may be achieved.

Referring to FIG. 4, the third and fourth sealing members 26, 30 may be positioned such that the third minimum width 74 is aligned longitudinally with the fourth maximum width 76, and the third maximum width 72 is aligned longitudinally with the fourth minimum width 78.

Figure 8:
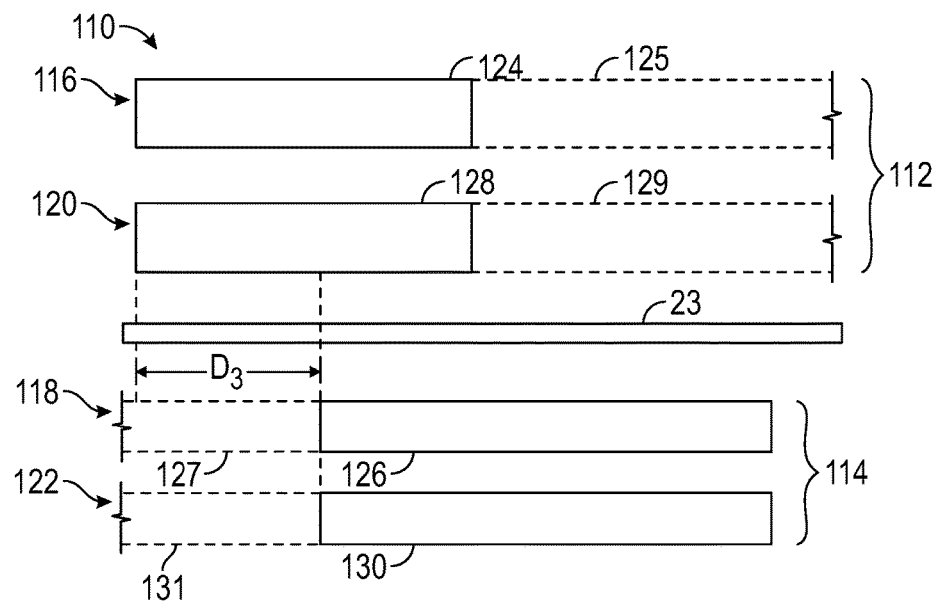
FIG. 8 is a schematic exploded fragmentary view of a plate assembly having an upper bipolar plate with first and second plates, and a lower bipolar plate with third and fourth plates; in accordance with a second embodiment of the disclosure.

Referring now to FIG. 8, a schematic exploded fragmentary view of a plate assembly 110 in accordance with a second embodiment of the disclosure is shown. The plate assembly 110 includes an upper bipolar plate 112 and a lower bipolar plate 114. Referring to FIG. 8, the upper bipolar plate 112 includes first and second sealing members 124, 128, formed on first and second plates 116, 120, respectively. The first and second plates 116, 120 define respective planar portions 125, 129. The first and second sealing members 124, 128 are raised relative to the respective planar portions 125, 29.

Similarly, the lower bipolar plate 114 includes third and fourth sealing members 126, 130, formed on third and fourth plates 118, 122, respectively. The third and fourth plates 118, 122 define respective planar portions 127, 131. The third and fourth sealing members 126, 130 are raised relative to the respective planar portions 127, 131.

Figure 9:
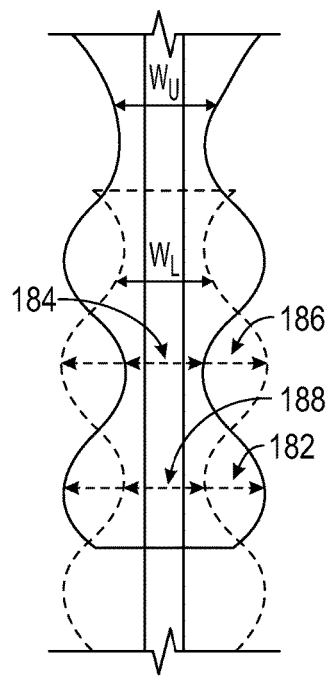
FIG. 9 is a schematic fragmentary top view of the upper bipolar plate and the lower bipolar plate of FIG. 8.

FIG. 9 is a schematic fragmentary top view of the upper bipolar plate 112 and the lower bipolar plate 114. Referring to FIG. 9, the first and second sealing members 124, 128 define a common upper width ($W_U$) varying continuously between a maximum upper width 182 and a minimum upper width 184. Referring to FIG. 9, the third and fourth sealing members 126, 130 define a common lower width ($W_L$) varying continuously between a maximum lower width 186 and a minimum lower width 188.

Referring to FIGS. 8-9, the upper and lower bipolar plates 112, 114 are offset relative to one another by a third offset distance ($D_3$) in a longitudinal direction such that the maximum upper width 182 is aligned longitudinally with the minimum lower width 188 and the minimum upper width 184 is aligned longitudinally with the maximum lower width 186. This provides a technical advantage of uniform pressure along the seal path, along with increased stiffness.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A plate assembly comprising:
   a first plate and a second plate positioned adjacent to one another;
   wherein the first plate includes a first sealing member stamped on the first plate;
   wherein the second plate includes a second sealing member stamped on the second plate;
   wherein the first sealing member includes a first end surface and first opposing sides extending from the first end surface, the first opposing sides being contiguous with the first plate at respective first bases;
   wherein the second sealing member includes a second end surface and second opposing sides extending from the second end surface, the second opposing sides being contiguous with the second plate at respective second bases;
   wherein the first and second sealing members are offset relative to one another by a first offset distance ($D_1$) in a first longitudinal direction, and
   wherein the first and second sealing members are characterized by respective cyclical patterns repeating at a predefined period, the first offset distance ($D_1$) being one-quarter of the predefined period.

2. The assembly of claim 1, wherein the first and second end surfaces are each substantially planar.

3. The assembly of claim 1, wherein:
   the first sealing member defines a first width between the first opposing sides at the respective first bases, the first width varying continuously between a maximum first width and a minimum first width in a lateral direction;
   the second sealing member defines a second width between the second opposing sides at the respective second bases, the second width varying continuously between a second maximum width and a second minimum width in the lateral direction.

4. The assembly of claim 3, wherein:
   the first and second sealing members are positioned such that the first maximum width is aligned longitudinally with the second minimum width and the first minimum width is aligned longitudinally with the second maximum width.

5. The assembly of claim 1, wherein the first offset distance ($D_1$) is between 0.5 millimeters to 5 millimeters.

6. A plate assembly comprising:
   a plurality of bipolar plates positioned in a stack, the plurality of bipolar plates including an upper bipolar plate and a lower bipolar plate;
   wherein the upper bipolar plate includes a first plate having a first sealing member stamped on the first plate and a second plate having a second sealing member stamped on the second plate:
   wherein the lower bipolar plate includes a third plate having a third sealing member stamped on the third plate and a fourth plate having a fourth sealing member stamped on the fourth plate; and
   wherein the first and second sealing members are offset relative to one another by a first offset distance ($D_1$) in a first longitudinal direction
   wherein the first and second sealing members are characterized by respective cyclical patterns repeating at a predefined period, the first offset distance ($D_1$) being one-quarter of the predefined period;
   wherein the third and fourth sealing members are characterized by respective cyclical patterns repeating at a second predefined period; and
   wherein the third and the fourth sealing members are offset relative to one another by a second offset distance ($D_2$) in a second longitudinal direction, the second offset distance ($D_2$) being one-quarter of the second predefined period.

7. The assembly of claim 6, wherein:
   the first longitudinal direction is opposite to the second longitudinal direction.

8. The assembly of claim 7, wherein:
   the first offset distance ($D_1$) is different from the second offset distance ($D_2$).

9. The assembly of claim 7, wherein:
the first sealing member defines a first width varying continuously between a maximum first width and a minimum first width in a lateral direction; and
the second sealing member defines a second width varying continuously between a second maximum width and a second minimum width in the lateral direction.

10. The assembly of claim 9, wherein:
the first and second sealing members are positioned such that the first maximum width is aligned longitudinally with the second minimum width and the first minimum width is aligned longitudinally with the second maximum width.

11. The assembly of claim 10, wherein:
the third sealing member defines a third width varying continuously between a maximum third width and a minimum third width in the lateral direction;
the second sealing member defines a fourth width varying continuously between a fourth maximum width and a fourth minimum width in the lateral direction; and
the third and fourth sealing members are positioned such that the third maximum width is aligned longitudinally with the fourth minimum width and the third minimum width is aligned longitudinally with the fourth maximum width.

12. The assembly of claim 6, wherein:
the first predefined period is different from the second predefined period.

13. The assembly of claim 1, wherein:
the first sealing member includes a first end surface and first opposing sides extending from the first end surface, the first opposing sides being contiguous with the first plate at respective first bases;
the second sealing member includes a second end surface and second opposing sides extending from the second end surface, the second opposing sides being contiguous with the second plate at respective second bases;
the first end surface and the first opposing sides extend away from the first plate in a first direction; and
the second end surface and the second opposing sides extend away from the second plate in a second direction opposite to the first direction.

14. The assembly of claim 6, wherein:
the first sealing member includes a first end surface and first opposing sides extending from the first end surface, the first opposing sides being contiguous with the first plate at respective first bases;
the second sealing member includes a second end surface and second opposing sides extending from the second end surface, the second opposing sides being contiguous with the second plate at respective second bases;
the first end surface and the first opposing sides extend away from the first plate in a first direction; and
the second end surface and the second opposing sides extend away from the second plate in a second direction opposite to the first direction.

* * * * *